US006907972B2

United States Patent
Chen

(10) Patent No.: US 6,907,972 B2
(45) Date of Patent: Jun. 21, 2005

(54) FREE-WHEEL HUB ASSEMBLY

(75) Inventor: Hubert Chen, Taichung Hsien (TW)

(73) Assignee: Kun Teng Industry Co., Ltd., Taichung Hsein (TW)

( * ) Notice: Subject to any disclaimer, the term of this patent is extended or adjusted under 35 U.S.C. 154(b) by 493 days.

(21) Appl. No.: 10/166,775

(22) Filed: Jun. 12, 2002

(65) Prior Publication Data

US 2003/0198418 A1 Oct. 23, 2003

(51) Int. Cl.$^7$ .......................... F16D 41/24; B60B 27/02
(52) U.S. Cl. ...................... 192/64; 192/110 B; 384/545
(58) Field of Search ............................... 192/64, 110 B; 384/545, 901; 474/160

(56) References Cited

U.S. PATENT DOCUMENTS 4,580,670 A * 4/1986 Nagano ........................ 192/64
6,260,681 B1 * 7/2001 Chen .......................... 384/545
6,386,644 B2 * 5/2002 Chen .......................... 192/64
6,497,314 B2 * 12/2002 Kanehisa ..................... 192/64

* cited by examiner

Primary Examiner—Thomas R. Hannon
(74) Attorney, Agent, or Firm—Foley & Lardner

(57) ABSTRACT

A free-wheel hub assembly includes an axle co-axially extending through a spoke-mounting hub and having a right axle portion disposed outwardly of a right end of the spoke-mounting hub. A tubular sleeve is sleeved on the axle, and is disposed in a right recess defined by the right end of the spoke-mounting hub. A self-lubricating bearing is sleeved on the tubular sleeve, is disposed in the right recess, and has an inner surface in sliding contact with the tubular sleeve. A sprocket mounting member is sleeved on the right axle portion, and has an annular coupling end which extends into the right end of the spoke-mounting hub and which is in sliding contact with an outer surface of the self-lubricating bearing.

1 Claim, 4 Drawing Sheets

FREE-WHEEL HUB ASSEMBLY

BACKGROUND OF THE INVENTION

1. Field of the Invention

The present invention relates to a free-wheel hub assembly for a bicycle.

2. Description of the Related Art

Referring to FIG. 1, a conventional free-wheel hub assembly is shown to include: a tubular spoke-mounting hub 2 having bowl-shaped left and right ends respectively defining left and right recesses therein; an axle 1 co-axially extending through the spoke-mounting hub 2 and having a right axle portion 100 disposed outwardly of the right end of the spoke-mounting hub 2; left and right inner bearings 201 sleeved on the axle 1 for rotatably mounting of the spoke-mounting hub 2 thereon in such a manner that the left and right recesses are disposed outwardly of the left and right inner bearings 201, respectively; a tubular sleeve 6 disposed in the right recess and sleeved on the axle 1; a sprocket mounting member 3 having an annular coupling end 301 extending into the right recess of the spoke-mounting hub 2 and radially spaced apart from the tubular sleeve 6 to define a gap "G" therebetween; left and right outer bearings 5 mounted around the right axle portion 100 to facilitate rotation of the sprocket mounting member 3 on the axle 1; and a ratchet unit 4 disposed in the right recess and coupled to the coupling end of the sprocket mounting member 3 and the right end of the spoke-mounting hub 2 so as to permit co-rotation of the sprocket mounting member 3 and the spoke-mounting hub 2.

One drawback of the aforementioned conventional free-wheel hub assembly resides in that the sprocket mounting member 3 can move in radial directions relative to the axle 10 due to presence of the gap "G" which, in turn, can result in unstable mounting of the ratchet unit 4 in the right recess of the spoke-mounting hub 2.

SUMMARY OF THE INVENTION

Therefore, the object of this invention is to provide a free-wheel hub assembly which includes a self-lubricating bearing that fills the gap in such a manner as to provide stable mounting of a ratchet unit in a right end of a spoke-mounting hub of the free-wheel hub assembly.

Accordingly, a free-wheel hub assembly of the present invention includes a tubular spoke-mounting hub, an axle, left and right inner bearings, a tubular sleeve, a tubular sleeve, a self-lubricating bearing, a sprocket mounting member, a ratchet unit, and an outer bearing. The tubular spoke-mounting hub has bowl-shaped left and right ends respectively defining left and right recesses therein. The axle co-axially extends through the spoke-mounting hub, and has a right axle portion disposed outwardly of the right end of the spoke-mounting hub. The left and right inner bearings are sleeved on the axle for rotatably mounting of the spoke-mounting hub thereon in such a manner that the left and right recesses are disposed outwardly of the left and right inner bearings, respectively. The tubular sleeve is disposed in the right recess, and is sleeved on the axle. The self-lubricating bearing is sleeved on the tubular sleeve, and has an outer surface and an inner surface opposite to the outer surface and that is in sliding contact with the tubular sleeve. The sprocket mounting member has an annular coupling end that extends into the right recess, and that is sleeved on and that is in sliding contact with the outer surface of the self-lubricating bearing, and a sprocket-mounting end opposite to the coupling end and disposed outwardly of the right recess around the right axle portion. The ratchet unit is disposed in the right recess around the coupling end of the sprocket mounting member, and is coupled to the coupling end of the sprocket mounting member and the right end of the spoke-mounting hub so as to permit co-rotation of the sprocket mounting member and the spoke-mounting hub. The outer bearing is sleeved on the right axle portion of the axle, and is in sliding contact with the sprocket mounting end of the sprocket mounting member.

BRIEF DESCRIPTION OF THE DRAWINGS

Other features and advantages of this invention will become more apparent in the following detailed description of the preferred embodiments of this invention, with reference to the accompanying drawings, in which.

DETAILED DESCRIPTION OF THE PREFERRED EMBODIMENTS

Figure 1:
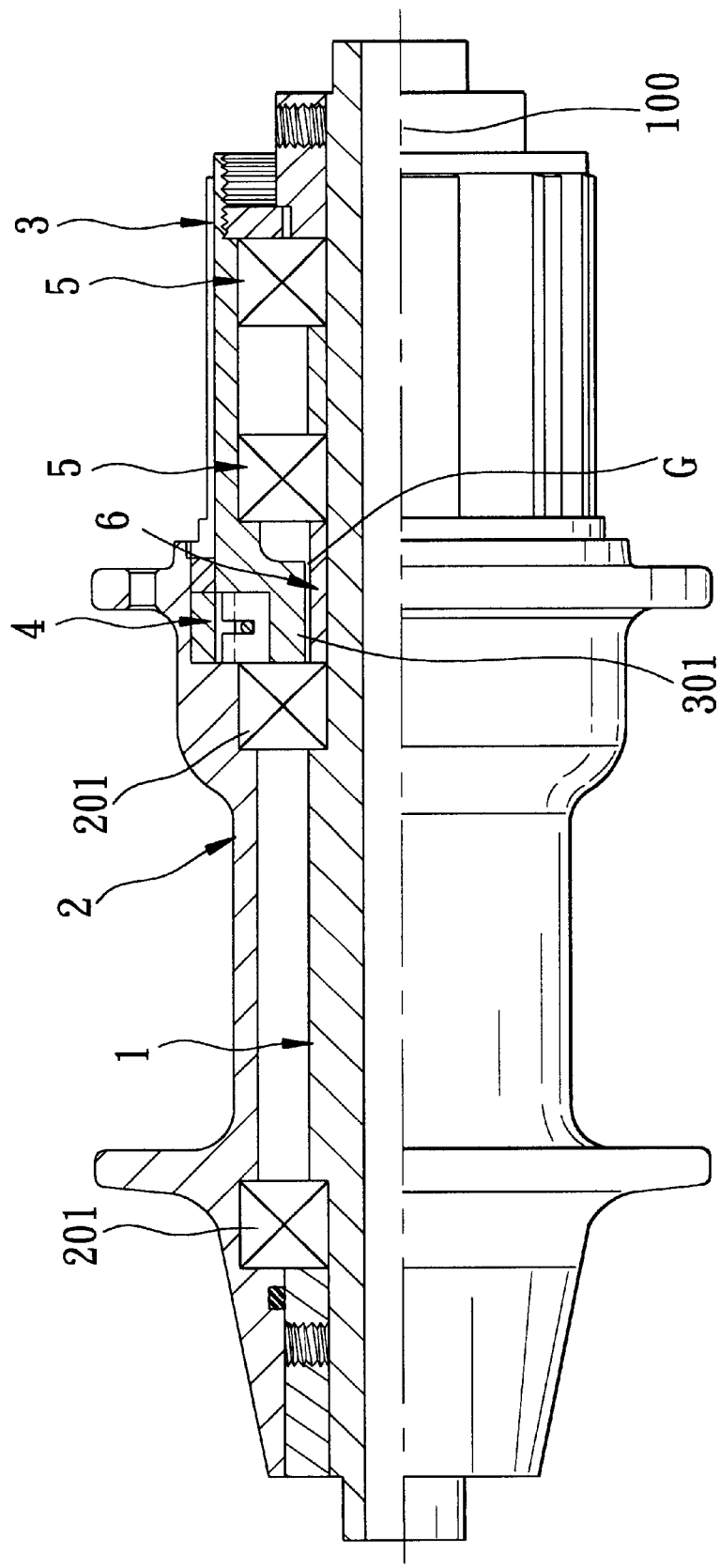
FIG. 1 is a partly sectional view of a conventional free-wheel hub assembly.
Figure 2:
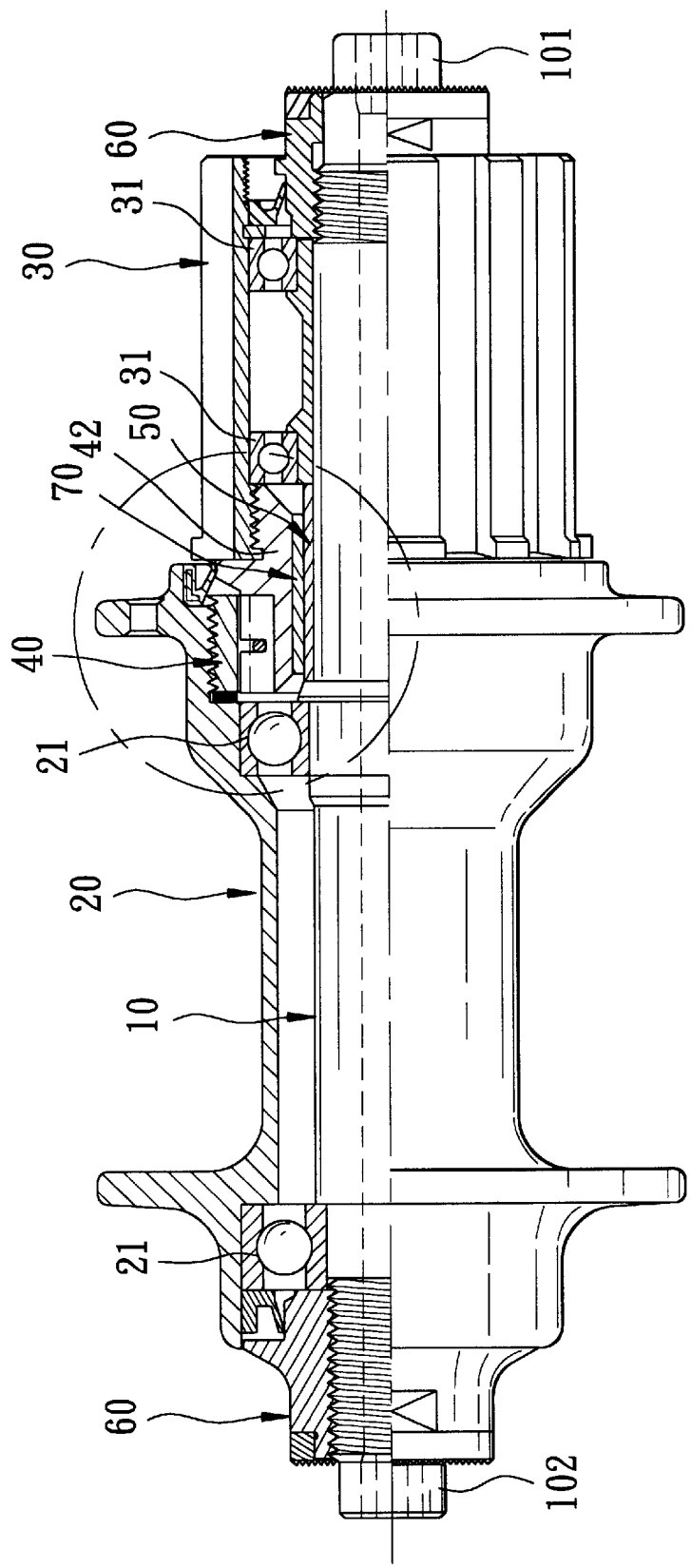
FIG. 2 is a partly sectional view of a preferred embodiment of a free-wheel hub assembly according to the present invention.
Figure 3:
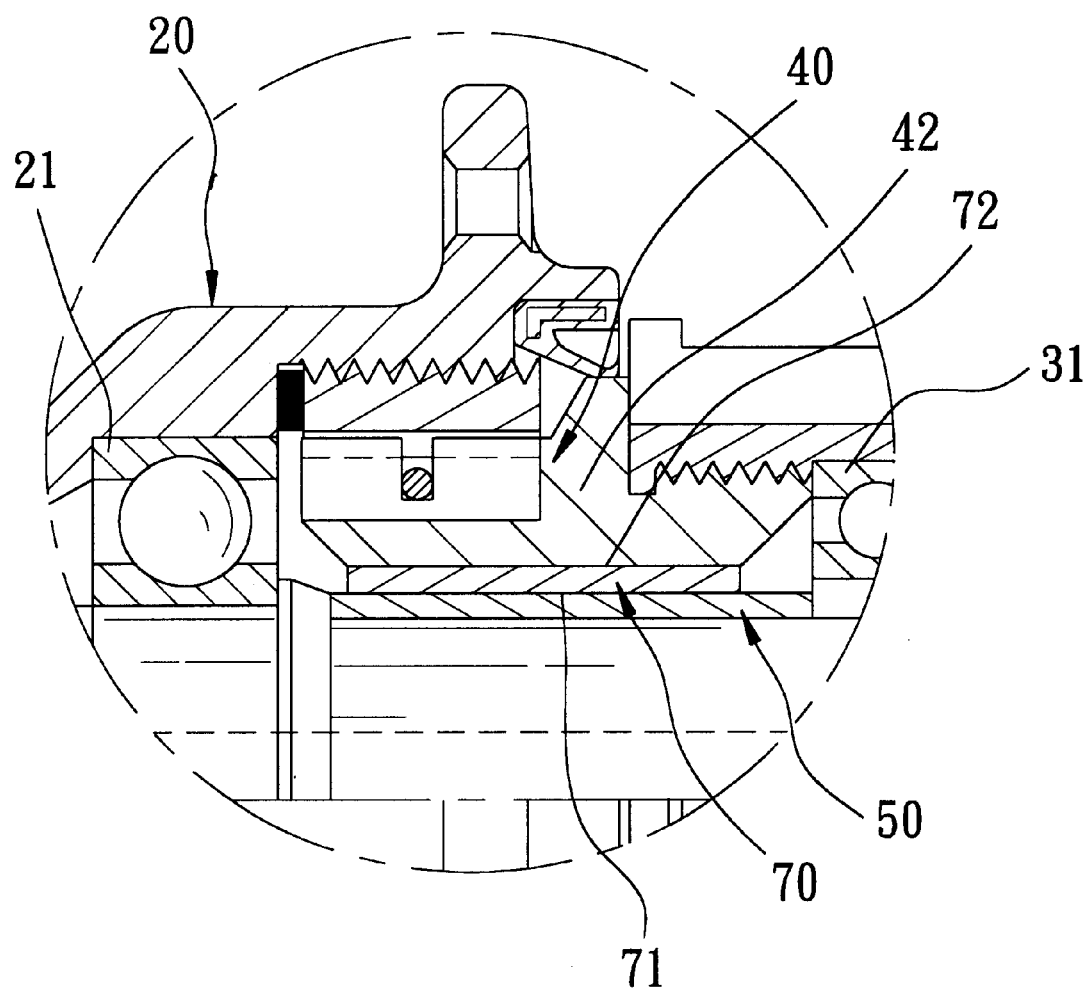
FIG. 3 is an enlarged view of a portion of the preferred embodiment shown in FIG. 2.

Referring to FIGS. 2 and 3, the preferred embodiment of a free-wheel hub assembly for a bicycle according to the present invention is shown to include a tubular spoke-mounting hub 20, an axle 10, left and right inner bearings 21, a tubular sleeve 50, a self-lubricating bearing 70, a tubular sprocket mounting member 30, a ratchet unit 40, and two outer bearings 31.

As illustrated, the tubular spoke-mounting hub 20 has bowl-shaped left and right ends respectively defining left and right recesses therein.

The axle 10 co-axially extends through the spoke-mounting hub 20, and has a right axle portion 101 disposed outwardly of the right end of the spoke-mounting hub 20.

The left and right inner bearings 21 are sleeved on the axle 10 for rotatably mounting of the spoke-mounting hub 20 thereon in such a manner that the left and right recesses are disposed outwardly of the left and right inner bearings 21, respectively.

The tubular sleeve 50 is disposed in the right recess, and is sleeved on the axle 10.

The self-lubricating bearing 70 is sleeved on the tubular sleeve 50, and has an outer surface 72 and an inner surface 71 opposite to the outer surface 72 and in sliding contact with the tubular sleeve 50.

The sprocket mounting member 30 has an annular coupling end 42 extending into the right recess in the spoke-mounting hub 20, and is sleeved on and is in sliding contact with the outer surface 72 of the self-lubricating bearing 70. The sprocket mounting member 30 further has a sprocket-mounting end opposite to the coupling end 42 and disposed outwardly of the right recess around the right axle portion 101 of the axle 10.

The ratchet unit 40 is disposed in the right recess around the coupling end 42 of the sprocket mounting member 30, and is coupled to the coupling end 42 of the sprocket mounting member 30 and the right end of the spoke-mounting hub 20 so as to permit co-rotation of the sprocket mounting member 30 and the spoke-mounting hub 20 when the bicycle is pedaled in a forward direction (not shown).

The outer bearings 31 are sleeved on the right axle portion of the axle 10 to facilitate rotation of the sprocket mounting member 30 on the axle 10 such that the outer bearings 31 are in sliding contact with the sprocket mounting end of the sprocket mounting member 30.

A left bearing retention nut 60 is threadedly mounted on a left axle portion 102 of the axle 10, and extends into the left recess of the spoke-mounting hub 20 to prevent disengagement of the left inner bearing 21 from the spoke-mounting hub 20. A right bearing retention nut 60 is mounted threadedly on the right axle portion 101, and extends into the sprocket mounting end of the sprocket mounting member 30 so as to prevent disengagement of the right outer bearing 31 from the sprocket mounting end of the sprocket mounting member 30.

With the inclusion of the self-lubricating bearing 70 in the hub assembly of the present invention, the drawback as encountered in the prior art can be eliminated. The self-lubricating bearing 70 is prevented from axial movement by the adjacent pair of the inner and outer bearings 21, 31. Since the structures of the inner and outer bearings 21, 31 and the ratchet unit 40 are not critical to the present invention, a detailed description thereof is omitted herein for the sake of brevity.

Figure 4:
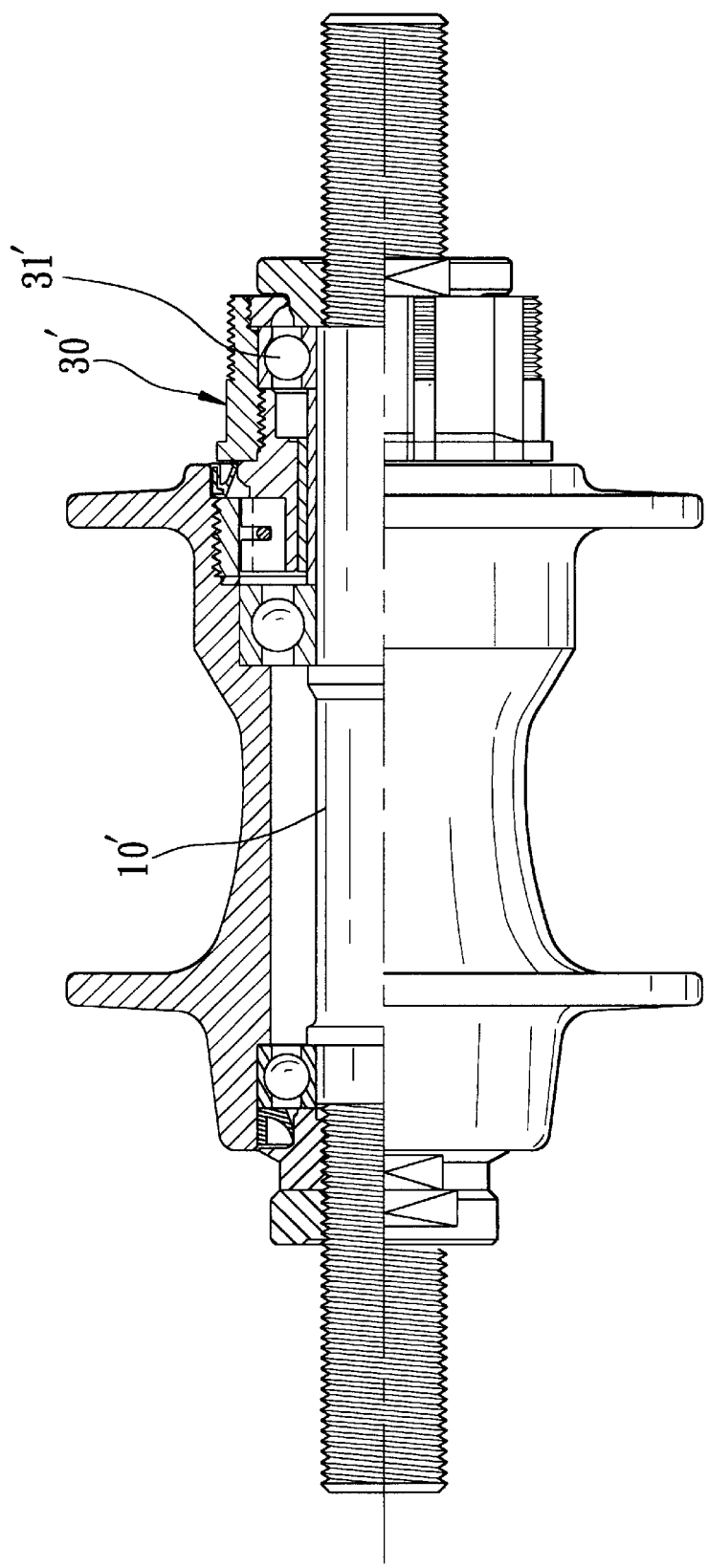
FIG. 4 is a partly sectional view of a modified preferred embodiment of the free-wheel hub assembly of the present invention.

Referring to FIG. 4, a modified preferred embodiment of a free-wheel hub assembly according to the present invention is shown to have a structure similar to that of the previous embodiment. The main difference resides in that since the sprocket mounting member 30' employed therein has a shorter axial length, only one outer bearing 31' is required to mount the same on the right axle portion of the axle 10'.

With this invention thus explained, it is apparent that numerous modifications and variations can be made without departing from the scope and spirit of this invention. It is therefore intended that the invention be limited only as indicated in the appended claims.

I claim:
1. A free-wheel hub assembly comprising:

a tubular spoke-mounting hub having bowl-shaped left and right ends respectively defining left and right recesses therein;

an axle co-axially extending through said spoke-mounting hub, and having a right axle portion disposed outwardly of said right end of said spoke-mounting hub;

left and right inner bearings sleeved on said axle for rotatably mounting of said spoke-mounting hub thereon in such a manner that said left and right recesses are disposed outwardly of said left and right inner bearings, respectively;

a tubular sleeve disposed in said right recess and sleeved on said axle;

a self-lubricating bearing sleeved on said tubular sleeve and having an outer surface and an inner surface opposite to said outer surface and in sliding contact with said tubular sleeve;

a sprocket mounting member having an annular coupling end extending into said right recess and sleeved on and in sliding contact with said outer surface of said self-lubricating bearing, and a sprocket-mounting end opposite to said coupling end and disposed outwardly of said right recess around said right axle portion;

a ratchet unit disposed in said right recess around said coupling end, and coupled to said coupling end of said sprocket mounting member and said right end of said spoke-mounting hub so as to permit co-rotation of said sprocket mounting member and said spoke-mounting hub; and at least one outer bearing sleeved on said right axle portion of said axle and in sliding contact with said sprocket mounting end of said sprocket mounting member.

* * * * *